United States Patent
Chunduru et al.

(10) Patent No.: US 8,127,880 B2
(45) Date of Patent: Mar. 6, 2012

(54) MECHANICAL SYSTEM FOR TILTING CAB OF A VEHICLE

(75) Inventors: Uday Srinivas Chunduru, Worli (IN); Karthik Srinvasan, Mumbai (IN)

(73) Assignee: Mahindra International Ltd., Mumbai (IN)

(*) Notice: Subject to any disclaimer, the term of this patent is extended or adjusted under 35 U.S.C. 154(b) by 0 days.

(21) Appl. No.: 12/896,527

(22) Filed: Oct. 1, 2010

(65) Prior Publication Data

US 2011/0017536 A1 Jan. 27, 2011

Related U.S. Application Data

(63) Continuation of application No. PCT/IN2009/000152, filed on Mar. 5, 2009.

(30) Foreign Application Priority Data

Mar. 7, 2008 (IN) .......................... 465/MUM/2008

(51) Int. Cl.
*B62D 33/067* (2006.01)
(52) U.S. Cl. ................................ 180/89.14; 296/190.05
(58) Field of Classification Search ............... 180/89.13, 180/89.14, 89.15, 89.16, 89.17, 89.18, 89.19, 180/69.2, 69.21; 296/190.01, 190.04, 190.05, 296/190.06, 190.07, 190.08; 74/89.39, 89.45, 74/425; 254/98, 100, 102, 103
See application file for complete search history.

(56) References Cited

U.S. PATENT DOCUMENTS

| | | | | |
|---|---|---|---|---|
| 782,520 | A * | 2/1905 | Pearl | 180/89.15 |
| 2,376,491 | A * | 5/1945 | Kinney, Jr. | 180/89.14 |
| 2,951,548 | A * | 9/1960 | Crockett et al. | 180/89.14 |
| 3,316,034 | A * | 4/1967 | Wanlass | 384/125 |
| 3,765,500 | A * | 10/1973 | Reeves | 180/328 |
| 3,781,058 | A * | 12/1973 | Ziolko et al. | 296/35.1 |
| 3,819,225 | A | 6/1974 | Carlisle | |
| 4,222,451 | A | 9/1980 | Lamb | |
| 4,359,119 | A * | 11/1982 | Kammerman | 180/69.21 |
| 4,413,694 | A | 11/1983 | Slocombe | |
| 5,060,742 | A * | 10/1991 | Kuhlmann et al. | 180/89.14 |
| 5,520,500 | A * | 5/1996 | McIlwain et al. | 414/685 |
| 6,073,714 | A * | 6/2000 | McHorse et al. | 180/89.14 |
| 6,991,055 | B2 * | 1/2006 | White et al. | 180/69.2 |
| 2002/0104699 | A1 | 8/2002 | Damhuis | |
| 2006/0086551 | A1 * | 4/2006 | Cleland et al. | 180/69.2 |
| 2007/0080011 | A1 * | 4/2007 | Kang | 180/89.14 |
| 2008/0265625 | A1 * | 10/2008 | List | 296/190.06 |

FOREIGN PATENT DOCUMENTS

| | | |
|---|---|---|
| GB | 1366220 B1 | 9/1974 |
| JP | 62125957 A * | 6/1987 |
| WO | 2007006137 B1 | 5/2007 |

* cited by examiner

*Primary Examiner* — Joseph Rocca
(74) *Attorney, Agent, or Firm* — George W. Moxon, II; Brian P. Harrod

(57) ABSTRACT

According to the present invention mechanical system for tilting cab of a vehicle, the rotational motion of the detachable handle (12) is transmitted to the worm shaft (14) through the engaging clip (15). The worm shaft (14) rotates the worm (11) which in turn rotates the nut (10). The nut (10) being restrained for translational motion, pushes the screw (9) upward. The screw (9) gets a translational motion and is raised. The clevis joint (8) on the top of the screw (9) forces the link arm (7) upwards. The link arm (7) also rotates about the clevis joint (8) due to the revolute joint. The link arm (7) transmits this motion through the bush (13) and the bush bracket (6) to the suspension bracket (3) of the cab (1). As a result the cab (1) tilts about its transverse axis (5).

4 Claims, 4 Drawing Sheets

MECHANICAL SYSTEM FOR TILTING CAB OF A VEHICLE

PRIORITY CLAIMED

This application claims the priority of International Patent Application PCT/IN2009/000152, filed Mar. 5, 2009 and Indian national application 465/MUM/2008, filed Mar. 7, 2008, both of which are incorporated herein by reference.

TECHNICAL FIELD

The present invention is related to a tilting mechanism for making the cab of a vehicle tilt with respect to the chassis of the vehicle. More particularly it is related to a mechanism to tilt driver's cab of commercial and/or like vehicles, forward with respect to the chassis.

BACKGROUND AND PRIOR ART

The cab of the vehicle needs to be tilted about a transverse axis from a normal operating position to a forward position so that the engine is exposed to facilitate servicing. Many tilting mechanisms for making a vehicle cab tilt are well known in the art. These mechanisms comprises of hydraulic system (hand actuated or electric motor actuated) or electric motor and gear mechanism or torsion bar mechanism.

However, the hydraulic mechanism is currently the most pervasive of all the other mechanisms. But some economy trucks have cabs which have to be tilted by hand without any intervening mechanism to reduce effort.

U.S. Pat. No. 4,222,451 discloses tilting cab for vans having a unitary interior volume containing a cab compartment and a rear compartment for cargo or passengers and an engine compartment extending substantially into the cab compartment. The forward tilting cab is attached to an engine compartment cover, which is raised to expose the engine of the van when the cab is tilted forward, thereby providing easy access to the engine to facilitate repairs and servicing of the engine.

The drawback of this invention is that an average sized person has to put one foot in stirrup and grasp handle with one or both hands, has to put all of his body weight to stirrup, lean backward and pull forward an handle causing cab to be tilted forward.

UK patent no. GB 2113619 describes a tilting mechanism for the cabs of vehicles. The mechanism comprises a cross member for attachment to the chassis of the vehicle, two hinge elements carried by the cross member and two lever arms hinged to the hinge elements for connection to the underside of the vehicle cab. The arrangement is intended for use in the conversion of fixed to tiltable cabs.

In this invention a jack is provided, one end of which is pivoted to the cross member of a chassis and other end is pivoted to the bottom of the cab at a position spaced from the hinge axis whereby controlled tilting of the cab can be achieved. The drawback of this invention is that it provides an inconvenient operating position, requiring the operator to be in front of the cab when it is tilting towards him.

Moreover the pivoted joints, at the top and bottom of the jack, force the jack also to rotate about the bottom pivot axis when the cab is being tilted. This makes the tilting operation inconvenient, especially when the tilting angle is large. This mechanism provides a stiff member at the bottom of the cab which hinders the cab movement on its suspension system thus affecting ride quality.

Patent Nos. 2002/0104699, WO 0125074, EP 1218235 and NL 1013228 discloses an invention related to a tilting mechanism for making the cab of a vehicle tilt relative to the chassis of the vehicle. The tilting mechanism comprises at least one fixing part that during the fitting of the cab on the chassis goes into a permanent engagement with a fixing part fitted on the cab and/or the chassis.

UK patent no. GB 1366220, France patent no. FR 2163056, German patent No. DE 2158484 and Sweden patent no. SE 378391 disclose tilting vehicle cabs in which the rear of a vehicle cab, which is mounted for tilting about a forward transverse axis, is supported on the chassis by adjustable and lockable piston/cylinder spring legs which engage the cab by sound insulating blocks. Cylinder is mounted by rubber rings in a collar on a chassis bracket, and block is adjustably screwed on the piston-rod. Cup, which seats block, is mounted on the cab and carries the spring leg locking mechanism, which includes a movable forked slide having an inclined end section. Slide, which is movable by means of a toothed segment lever, engages under the flange of a sleeve, which is slidably mounted on piston-rod and is urged downwardly by springs. As shown the spring leg is locked; on moving the slide to the left it disengages the sleeve and flange. A cab-mounted guide and a roller a bracket ensure lateral guidance of the cab. A cab-mounted spring biased catch and an extension of bracket insure against accidental tipping of the cab.

Patent Nos. WO 2007061371 and SE 529016 discloses cab tilt device fitted to a cab of a motor vehicle, e.g. a truck, comprising at least one cab tilt means adapted to applying to the cab a tilt force in order to tilt said cab in the forward direction of the cab about a chassis fastening arranged close to the cab's forward lower portion and comprising a spring means fastened pivotably close to the cab's forward lower portion, whereby a forward link means is adapted to being connected pivotably to the cab, and whereby a connecting means is connected to the cab, which connecting means is adapted to connecting said cab tilt means and said forward link means, whereby tilt force applied from the cab tilt means during tilting is adapted to being transmitted via the connecting means to the cab in such a way that the spring means is kept substantially compressed at least during initial stage of the tilting process.

DEFICIENCIES OF PRIOR ART

1. The Prior art patents have hydraulic leaks and high replacement costs.
2. Most of the Prior art Patents are bulky and costly systems.
3. In the prior art patents increased effort is required to pull the cab from the fully tilted position to riding position.
4. In the prior art concepts stresses are built in underbody due to torsion bar.
5. In most of the prior art patents there is an unergonomic operation of the tilting mechanism.
6. Some mechanisms hinder cab movement when the cab is in riding mode (i.e fully down condition). This is particularly a problem in cabs having their own suspensions, apart from the vehicles.

OBJECT OF THE PRESENT INVENTION

The main object of the present invention is to overcome the drawbacks in the prior art and to provide mechanical system to tilt the cab with respect to chassis which is fitted between the chassis and cab of the vehicle and can be operated externally.

Another object of the present invention is to provide easy and rapid tilting mechanism for the cab of the vehicles with high degree of safety.

Further object of the present invention is to provide easy access to the engine to facilitate repairs and servicing of the engine and other operations.

SUMMARY OF THE INVENTION

The present invention is related to a tilting mechanism for making the cab of a vehicle tilt with respect to the chassis of the vehicle. According to the present invention mechanical system for titling cab of a vehicle the rotational motion of the detachable handle is transmitted to the worm shaft through the engaging clip. The worm shaft rotates the worm which in turn rotates the nut. The nut being restrained for translational motion, pushes the screw upward. The screw gets a translational motion and is raised. The clevis joint on the top of the screw forces the link arm upwards. The link arm also rotates about the clevis joint due to the revolute joint.

The link arm transmits this motion through the bush and the bush bracket to the suspension bracket of the cab. As a result the cab tilts about its transverse axis.

DETAILED DESCRIPTION OF THE INVENTION

The foregoing objects of the invention are accomplished and the problems and shortcomings associated with prior art techniques and approaches are overcome by the present invention as described below in the preferred embodiment.

This invention is illustrated in the accompanying drawings, throughout which like reference letters indicate corresponding parts in the various figures.

Commercial vehicles having a cab compartment and a cargo or passenger compartment are very popular in Indian market for a number of reasons. These vehicles commonly have an engine compartment extending partly or completely into the cab compartment of the vehicle. Therefore, it was desirable to have simple and rapid mechanism to tilt the cab to have access to the engine/transmission for its repair and service and other operations. The innovativeness of this mechanical system to tilt the cab and its advantages over the prior art will become apparent to those skilled in the art upon reading the following description with reference to the accompanying drawings.

Figure 1:
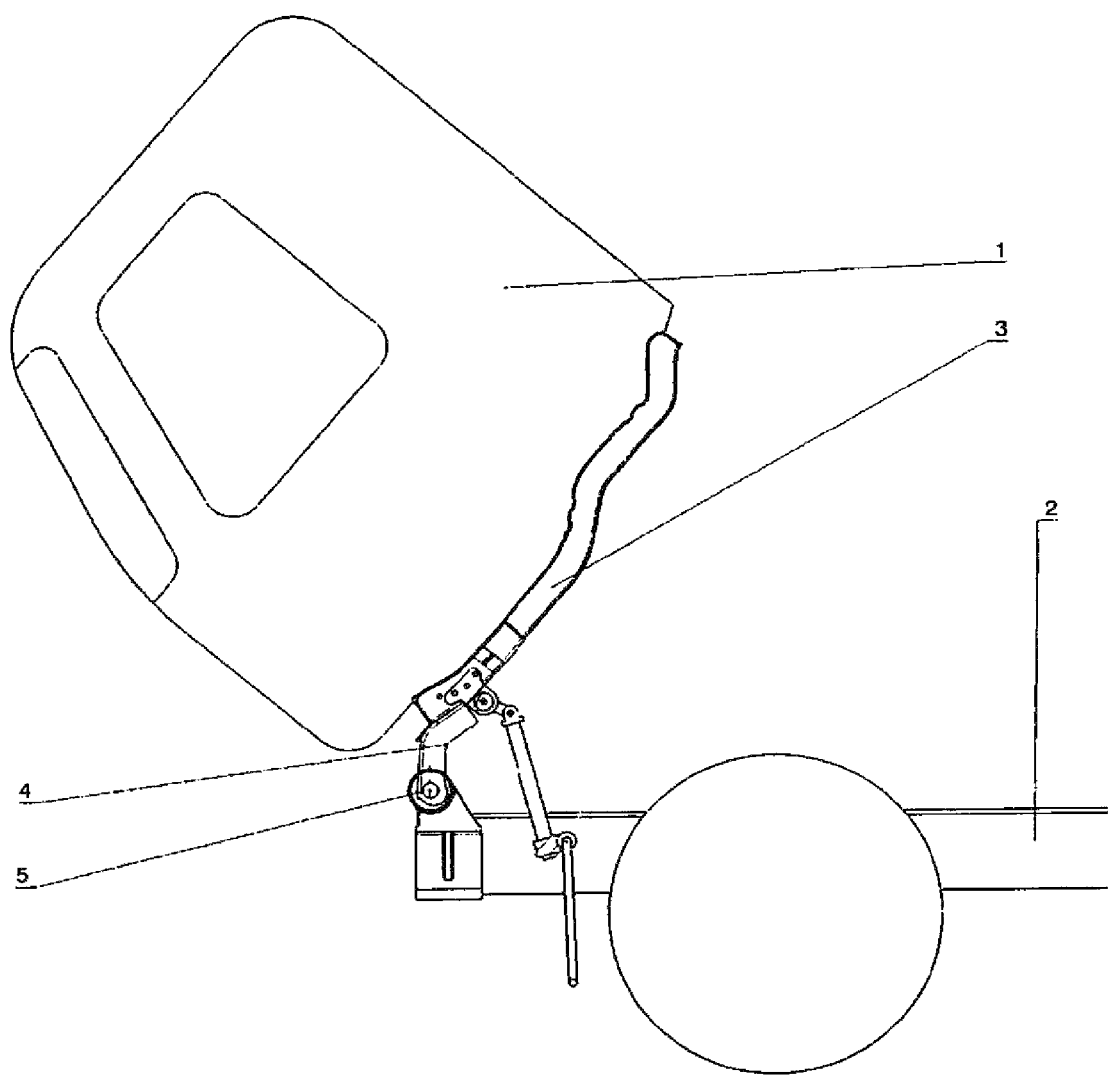
FIG. 1 shows the side view of a cab and chassis arrangement embodying the invention, the cab being shown in its fully tilted position.

With reference to FIG. 1, the truck includes a cab (1) and a chassis (2). The cab (1), as shown in the tilted position, is pivotally mounted on the chassis (2) for tilting movement. The tilting of the cab from the riding position to a fully tilted position takes place about a transverse tilting axis (5). In its riding position, the cab (1) is supported by front cab suspension springs and rear cab suspension springs. The arrangement of the mechanical system for tilting a cab comprises a suspension bracket (3) that supports the cab and is mounted on the underside of the cab, and a suspension arm (4). The forward end of the suspension arm (4) is pivotally connected to the chassis (2) to form the tilting pivot. The reward end of the suspension arm is rigidly connected to the suspension bracket (3).

Figure 3:
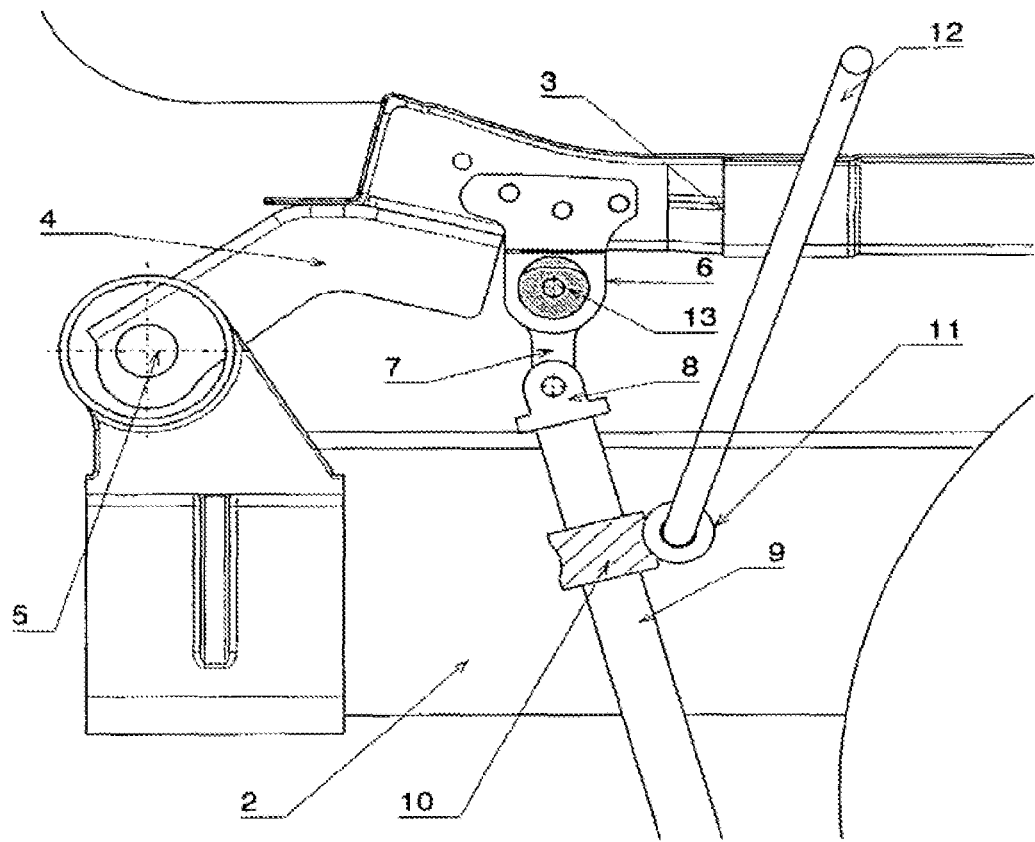
FIG. 3 shows the detailed side view of the present invention mechanism, the cab being in the riding position.
Figure 4:
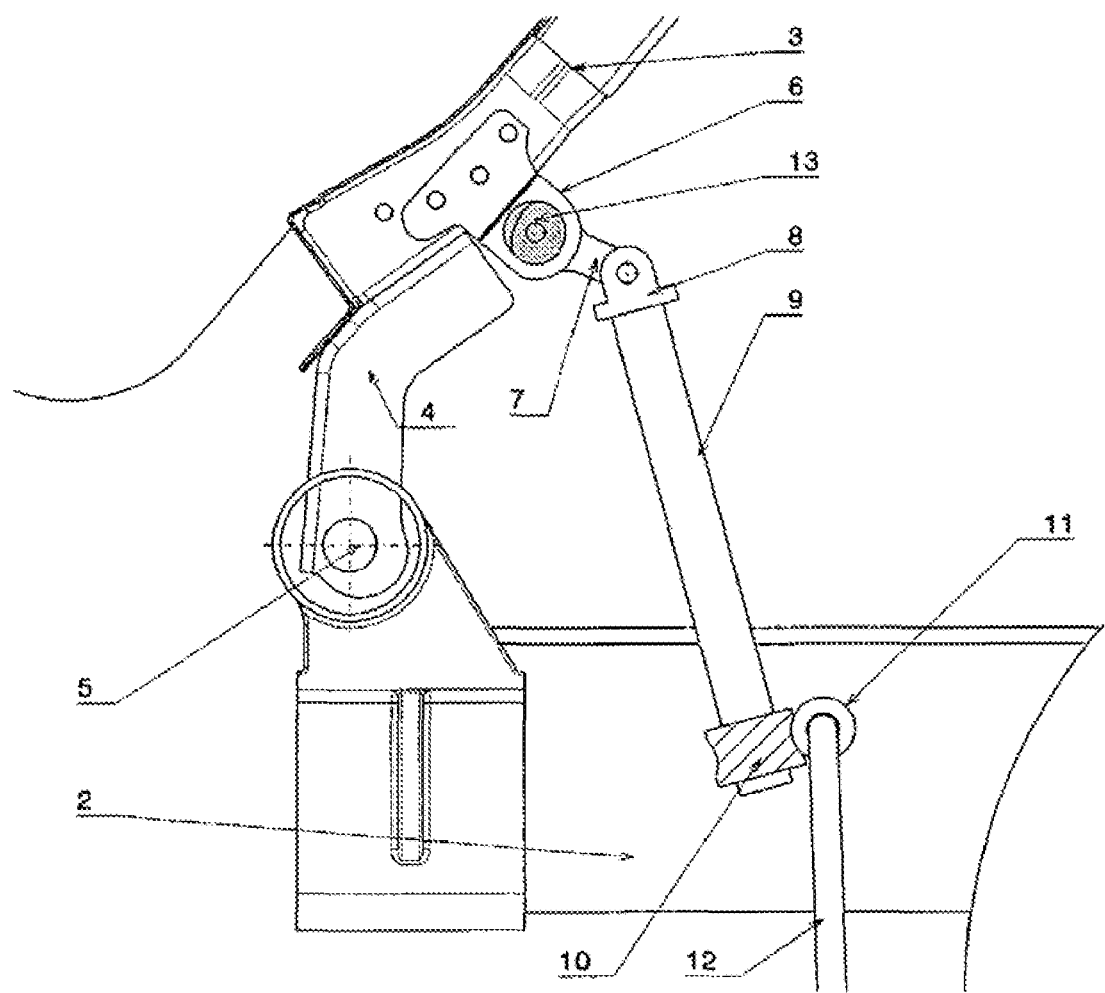
FIG. 4 shows the detailed side view of the present invention mechanism, the cab being in the fully tilted position.

Referring to FIG. 3, the underside of the suspension bracket (3) is fitted with a bush bracket (6). This bush bracket (6) is fitted with a rubber bush (13) which accommodates the bump and rebound of the cab (1). This bush bracket (6) is connected to the upper end of a link arm (7) by a revolute joint (allowing only rotational motion). The lower end of the link arm (7) is connected to the clevis joint (8) as a revolute joint (allowing only rotational motion). The clevis joint (8) has a rotational joint which connects it to the screw (9), this arrangement nullifying the rotational motion of the screw. The screw (9) meshes with a nut (10), whose inner surface has a matching thread and the outer surface is machined as a worm gear.

This nut (10) has the freedom only for rotational motion but is restrained for any other motion (including translational motion). The outer surface of the nut (10) meshes with a worm (11).

Figure 2:
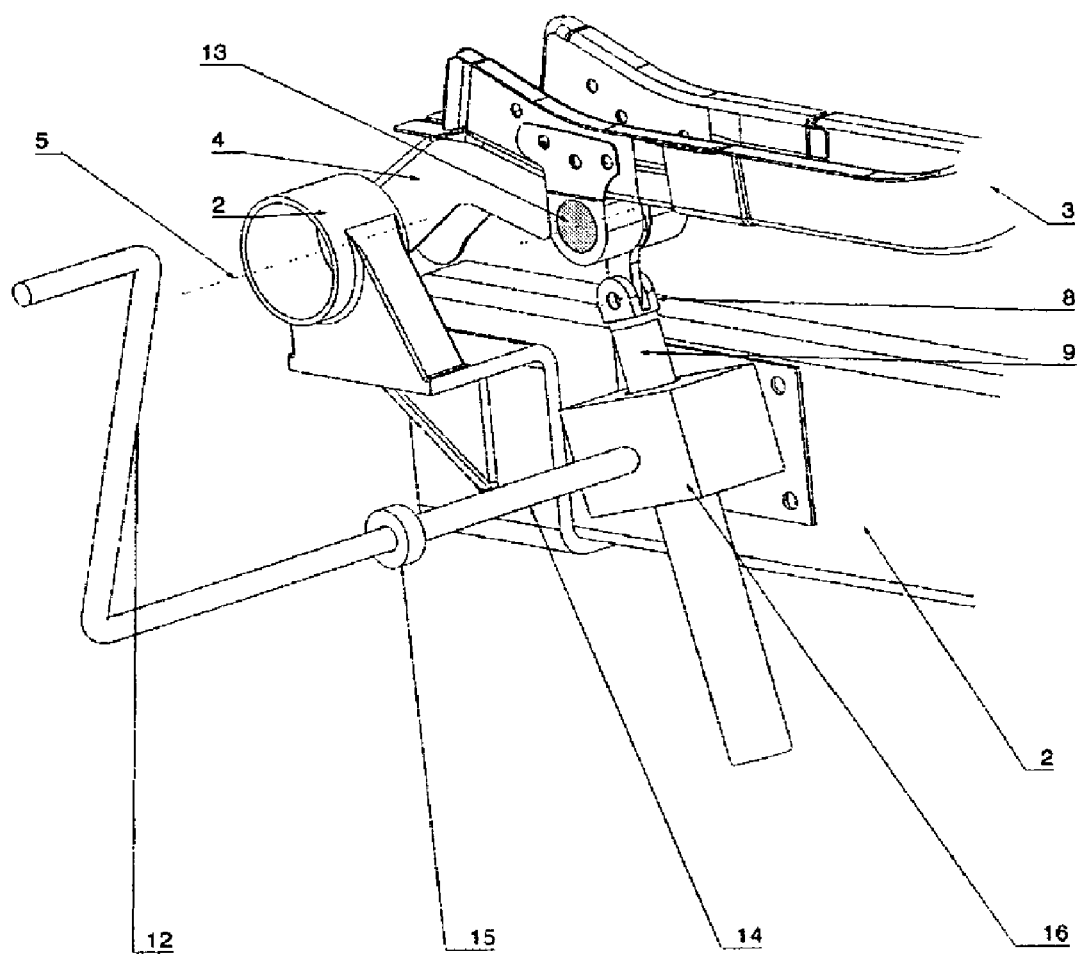
FIG. 2 shows an isometric view from the rear illustrating the cab tilting mechanism with the cab in riding position.

Referring to FIG. 2, the worm (11) is rigidly connected to one end of a worm shaft (14). The other end of worm shaft (14) is rigidly connected to an engaging clip (15). The engaging clip (15) engages a detachable handle (12). A housing (16) may be included to cover the worm gear machined nut (10) and the screw (9). The housing (16) is attached chassis (2). The user provides the input to the system through the detachable handle (12). When the user has to raise the cab (1), the user will engage the detachable handle (12) to the engaging clip (15). The user will then rotate the detachable handle (12). The rotational motion of the detachable handle (12) is transmitted to the worm shaft (14) through the engaging clip (15). The worm shaft (14) rotates the worm (11) which in turn rotates the nut (10). The nut (10) being restrained for translational motion, pushes the screw (9) upward. The screw (9) gets a translational motion and is raised. The clevis joint (8) on the top of the screw (9) forces the link arm (7) upwards. The link arm (7) also rotates about the clevis joint (8) due to the revolute joint. The link arm (7) transmits this motion through the bush (13) and the bush bracket (6) to the suspension bracket (3) of the cab (1). As a result, the cab (1) tilts about its transverse axis (5). In riding position, the bump and rebound of the cab (1) is accommodated by the bush (13) transmitting almost negligible/no shocks to the screw (9). The bush (13) causes an acceptable lost motion when tilting the cab (1).

A separate mechanism, not shown in the drawing, is provided for locking the cab in position and prevents it from falling down in case of failure of this mechanism.

The foregoing objects of the invention are accomplished and the problems and shortcomings associated with prior art techniques and approaches are overcome by the present invention described in the present embodiment.

Detailed descriptions of the preferred embodiment are provided herein; however, it is to be understood that the present invention may be embodied in various forms.

Therefore, specific details disclosed herein are not to be interpreted as limiting, but rather as a basis for the claims and as a representative basis for teaching one skilled in the art to employ the present invention in virtually any appropriately detailed system, structure or matter.

The embodiments of the invention as described above and the methods disclosed herein will suggest further modification and alterations to those skilled in the art.

Such further modifications and alterations may be made without departing from the spirit and scope of the invention; which is defined by the scope of the following claims.

ADVANTAGES OF THE PRESENT INVENTION

1. Easy and effortless operation of the mechanism.
2. Easy serviceability.
3. Low replacement costs.
4. No system eccentricities.
5. Less maintenance costs.
6. It is an effective solution where cost of a vehicle is a major issue and the manufacturer is willing to compromise sophistication for simplicity.

What we claimed is:

1. A mechanical system for a vehicle comprising a cab (1) and chassis (2), said mechanical system for tilting the cab (1) relative to the chassis (2), and comprising:
   a suspension arm (4) having a front end and a reward end, where the front end is pivotally connected to the chassis (2) forming a tilting pivot and the reward end is rigidly connected to a suspension bracket (3);
   a bush bracket (6) fitted to the underside of the suspension bracket (3);
   a link arm (7) having an upper end and a lower end, the upper end comprising a revolute joint that allows for only rotational motion and being connected to the bush bracket (6), and the lower end connected to clevis joint (8) and comprising a revolute joint that allows for only rotational movement;
   a screw (9) connected to the clevis joint (8) and comprising a rotational joint, the screw (9) meshing with a nut (10), where an inner thread of nut (10) matches an external thread of screw (9) and an outer surface of nut (10) is machined as a worm gear;
   a worm (11) rigidly connected to a first end of worm shaft (14) and meshing with the outer surface of nut (10); and
   an engaging clip (15) rigidly connected to a second end of worm shaft (14), where the engaging clip engages a detachable handle (12).

2. The mechanical system of claim 1, where when the cab (1) is in riding position, the cab (1) further comprises a rubber bush (13) fitted to bush bracket (6) that reduces the transmission of shock to the screw (9) to accommodate a bump and rebound of the cab (1).

3. The mechanical system of claim 1, further including a means to tilt the cab(1) about its traverse axis (5), wherein the means includes rotating the detachable handle (12) which transmits the rotational movement to the worm shaft (14) through the engaging clip (15), where the worm shaft (14) rotates the worm (11) and in turn rotates the nut (10), where the nut (10) is restrained from translational movement and pushes the screw (9) upward causing the screw (9) to be raised and the clevis joint on top of the screw (9) forces the link arm (7) upwards, where the link arm (7) rotates about the clevis joint (8) due to the revolute joint and the link arm (7) transmits this motion through the rubber brush (13) and the bush bracket (9) to the suspension bracket (3) of a cab (1).

4. The mechanical system of claim 1, wherein the detachable handle (12) is operable from the left hand side of the vehicle.

* * * * *